United States Patent [19]
Greene et al.

[11] Patent Number: 5,419,593
[45] Date of Patent: May 30, 1995

[54] INTERLOCKING UNION FOR DOUBLE CONTAINMENT PIPE

[75] Inventors: Karen C. Greene, Tulsa; James A. Cheek, Broken Arrow, both of Okla.

[73] Assignee: Conley Corporation, Tulsa, Okla.

[21] Appl. No.: 272,037

[22] Filed: Jul. 8, 1994

Related U.S. Application Data

[63] Continuation-in-part of Ser. No. 139,829, Oct. 22, 1993, Pat. No. 5,368,338.

[51] Int. Cl.⁶ .............................................. F16L 47/02
[52] U.S. Cl. ................... 285/133.1; 285/419; 285/915; 138/114; 156/294
[58] Field of Search ............... 285/133.1, 915, 419, 285/293, 138; 138/111, 113, 114; 156/304.2, 293, 294

[56] References Cited

U.S. PATENT DOCUMENTS

| | | |
|---|---|---|
| 240,497 | 4/1881 | Babcock .................. 138/114 |
| 534,473 | 2/1895 | Harvey .................... 138/114 |
| 1,909,075 | 5/1993 | Ricker et al. ............. 285/133.1 X |
| 3,068,026 | 12/1962 | McKamey . |
| 3,146,005 | 8/1964 | Peyton . |
| 3,907,049 | 9/1975 | Baffas . |
| 4,108,476 | 8/1978 | Krupp . |
| 4,615,543 | 10/1986 | Cannon . |
| 4,779,652 | 10/1988 | Sweeney . |
| 4,786,088 | 11/1988 | Ziu . |
| 4,886,305 | 12/1989 | Martin . |
| 4,930,544 | 6/1990 | Ziu . |
| 4,939,923 | 7/1990 | Sharp . |
| 5,022,685 | 6/1991 | Stiskin et al. . |
| 5,087,308 | 2/1992 | Wermelinger . |
| 5,141,261 | 8/1992 | Ziu . |
| 5,143,407 | 9/1992 | Cokeh . |
| 5,186,502 | 2/1993 | Martin . |
| 5,368,338 | 11/1994 | Green et al. ............. 285/133.1 |

FOREIGN PATENT DOCUMENTS

| | | |
|---|---|---|
| 0908926 | 10/1962 | United Kingdom . |
| 0631742 | 11/1978 | U.S.S.R. . |
| 1018239 | 11/1991 | WIPO ................... 285/293 |

*Primary Examiner*—Randolph A. Reese
*Assistant Examiner*—Heather Chun Shackelford
*Attorney, Agent, or Firm*—Head & Johnson

[57] ABSTRACT

A process to install an interlocking union for joining a first double containment pipe having a first carrier pipe within a first containment pipe to a second double containment pipe having a second carrier pipe within a second containment pipe. The process includes slipping a first locking ring into position over the outside diameter of the first carrier pipe to stop against the first containment pipe. A carrier coupling is adhesively bonded to the first carrier pipe stopping against the first locking ring. Thereafter, a second locking ring is slipped into position over the second carrier pipe stopping against the second containment pipe. The carrier coupling is adhesively bonded to the second carrier pipe stopping against the second locking ring. Finally, a containment coupling is bonded to the first containment pipe and to the second containment pipe.

8 Claims, 4 Drawing Sheets

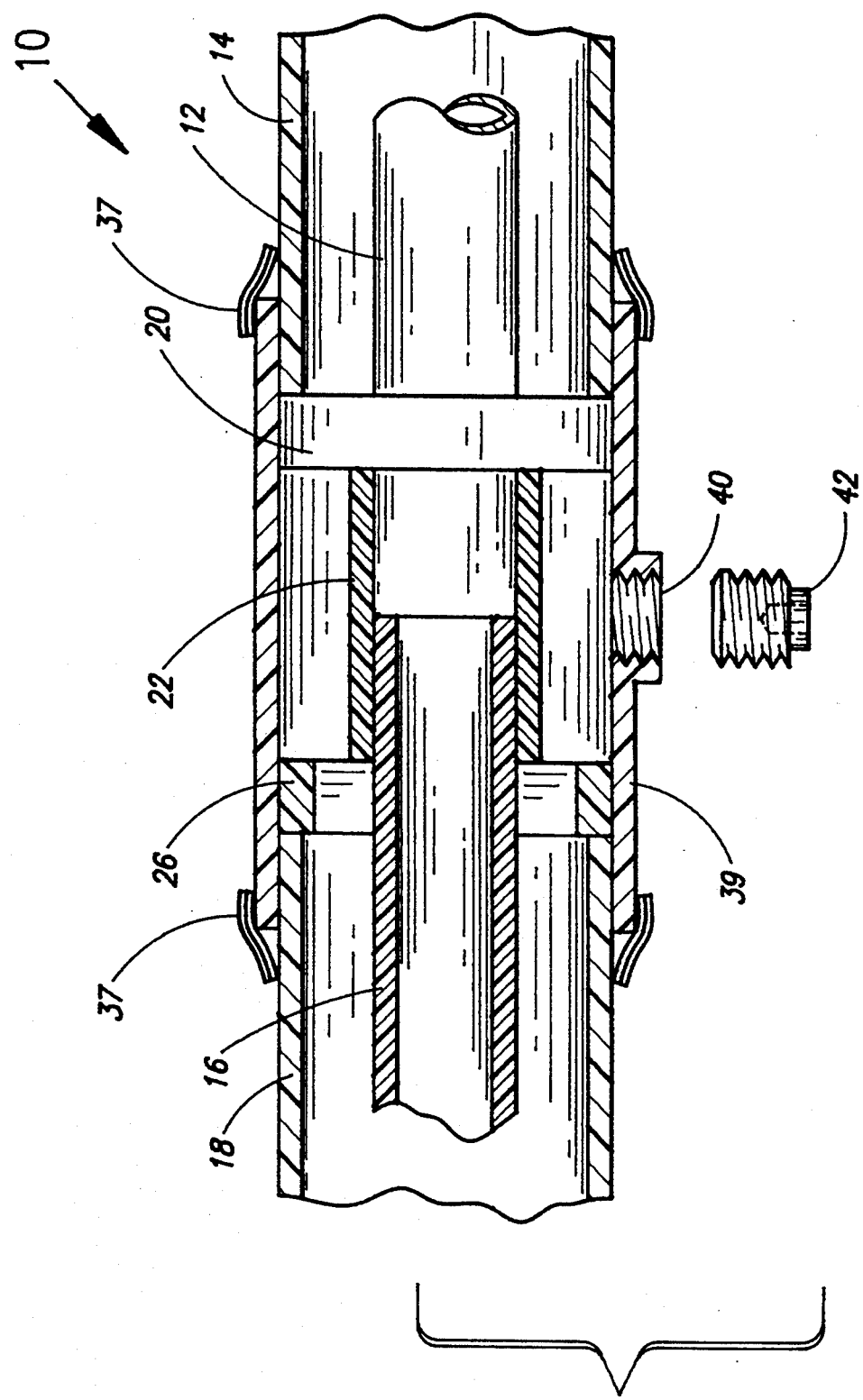

INTERLOCKING UNION FOR DOUBLE CONTAINMENT PIPE

CROSS-REFERENCE OF APPLICATION

This is a continuation-in-part application of Ser. No. 08/139,829, filed Oct. 22, 1993, now U.S. Pat. No. 5,368,338, entitled "Interlocking Union System for Double Containment Pipe" which is incorporated herein by reference.

BACKGROUND OF THE INVENTION

1. Field of the Invention

The present invention relates to interlocking unions for double containment pipe systems. More particularly, the present invention relates to double containment pipe systems having interlocking unions which will prevent longitudinal movement of the carrier pipe with respect to the containment pipe.

2. Prior Art

Double containment pipe systems are utilized for transporting fluids comprising an inner, or carrier, pipe, positioned concentrically within an outer, or containment, pipe. Both a carrier pipe and its related containment pipe are constructed by a series of pipe sections joined by pipe joints.

Traditionally, a carrier pipe system is intended to, and is constructed to, provide a means for transporting a fluid over a long distance efficiently and without allowing any of the fluid to escape from the carrier pipe system. The most common causes of escape of a fluid from a carrier pipe system are either a break in a pipe section, a break in a pipe joint, or a loosening of a pipe joint.

A carrier pipe system is constructed to be a safe and reliable means for transporting fluids, especially fluids which might be dangerous or which might contaminate the surrounding area should any escape from the carrier pipe system. Occasionally, a carrier pipe does fail and contaminating fluid covers the surrounding area.

The carrier pipe is normally independent from the double containment pipe which encloses it, and the double containment pipe is not in communication with the carrier pipe unless and until the carrier pipe should develop a leak. Then, the double containment pipe serves its basic purpose by collecting fluid escaping from the carrier pipe and becomes a means for transporting and storing the fluid until the leak is discovered and repaired.

In any double containment pipe system the most elaborate component, and the component most likely to fail, is the pipe joint which joins two adjacent pipe sections of the carrier pipe system.

Pipe systems have been traditionally constructed of steel or other forms of metal. With the development of fiber glass reinforced resins, simple carrier pipe systems started to be constructed of fiber glass reinforced resins where such usage was permissible.

Double containment piping systems are, however, relatively new to the fiber glass resin pipe industry, and a great deal of the design requirements and capabilities of the fiber glass resin double containment systems are being developed even as the systems are being installed.

The primary object of the present invention is to provide an interlocking union system for a double containment pipe which is easy to produce, easy to install, and efficient in operation.

Another object of the present invention is to provide a double containment piping system which can be easily secured in position.

Still another object of the present invention is to provide an interlocking union system which will prevent longitudinal movement of the carrier pipe with respect to the containment pipe.

Still another object of the present invention is to provide a containment interlocking union system of unique design and great strength.

Still another object of the present invention is to provide a containment interlocking union system capable of easily and efficiently incorporating signal transmitting components within the system.

Still another object of the present invention is to provide a double containment piping system of a design permitting easy access to the interior of the double containment system.

SUMMARY OF THE INVENTION

As the use of pipe formed of synthetic resin reinforced with fiber glass became acceptable and developed for use in double containment piping systems, the present invention anticipates some of the special requirements in this field. To develop the double containment piping system one must understand how best pipe formed of fiber glass reinforced resin might be utilized for double containment piping systems.

The inherent qualities of fiber glass reinforced resin permit constructing a fiber glass reinforced resin double containment piping system having numerous advantages over a double containment system constructed of steel or other strong and heavy metal, particularly in the design of the closure joint.

Pipe formed of fiber glass reinforced resin is light weight, which makes it easy to handle and transport. Fiber glass resin pipe and pipe joints are easy to manufacture, even in the intricate structures designed for our invention.

Also, another outstanding quality of pipe and pipe joints molded of the typical synthetic resin used for their manufacture is that the pipe and pipe joints are substantially inert to any of the chemicals to which the double containment system might subsequently be exposed.

The double containment piping system of the present invention comprises a containment pipe with the pipe sections secured to each other by pipe joints of unique design. The pipe joints were designed also to provide efficient seals for the double containment pipe, and to secure the double containment pipe system in position concentrically around the carrier pipe.

The interlocking union system of the present invention effectively serves three purposes in a double containment piping system.

The first purpose is to effect a seal in the containment or outer pipe of the system. This seal may be provided as a permanent closure by using a standard adhesive or sealant, such as an epoxy material, or as a temporary closure by using a silicone sealant with clamps.

The second purpose of the interlocking union is as a support system or anchor point for the carrier pipe. In double containment piping systems, this inside pipe or carrier pipe should be restrained from movement relative to the outer pipe in order to minimize bending stress on all the fittings. Movement may occur from thermal expansion or contraction due to fluid through the pipes and the external temperature. The present invention provides locking rings that will physically restrain the carrier pipe coupling.

The third purpose of the interlocking union is to serve as a "pull point" for any cable detection system that may be used with the double containment system. Since the double containment joint will be the last component to be installed when the double containment piping system is assembled, the closure joint becomes a natural place in which to provide an opening to pull a detection cable. For instance, a cable of a signal system may be threaded or pulled through a unique space within the containment interlocking union system, and a closure is held in place to complete the installation of the joint. Thus, the interlocking union is constructed of two cooperating components which seal together around the carrier pipe with the signal cable sealed within.

Further, a special version of the interlocking union includes a threaded opening in the lower section of the containment pipe joint fitted with a threaded plug which will permit access to the enclosed detection cable for replacement or repair of the cable when necessary.

The interlocking union has several benefits over the currently available type of joint in existing double containment systems.

In some systems it is very difficult to completely install and test the entire carrier or inside piping and yet have a system in which it is easy to visually check all of these carrier pipe joints.

Another improvement concerns the anchoring of the double containment system. In some currently available double containment systems the carrier pipe is anchored to the containment pipe only at the elbows. This not only increases the stress at the elbows after the system is installed, but requires an elbow that is very expensive to manufacture by reason of special design.

The interlocking union is designed to absorb a great deal of the stress inherent in the construction of a double containment system, so that the carrier pipe system may be built with standard elbows.

Each interlocking union should preferably include a longitudinal channel so that there will be communication from one end of the interlocking union to the other, and in the event that the carrier pipe joint breaks, would fulfill the purpose of the closure joint.

We have furthermore designed this communication channel to be adaptable for placement of a signal cable along the length of the double containment piping system, if desired.

DETAILED DESCRIPTION OF THE PREFERRED EMBODIMENTS

Figure 1:
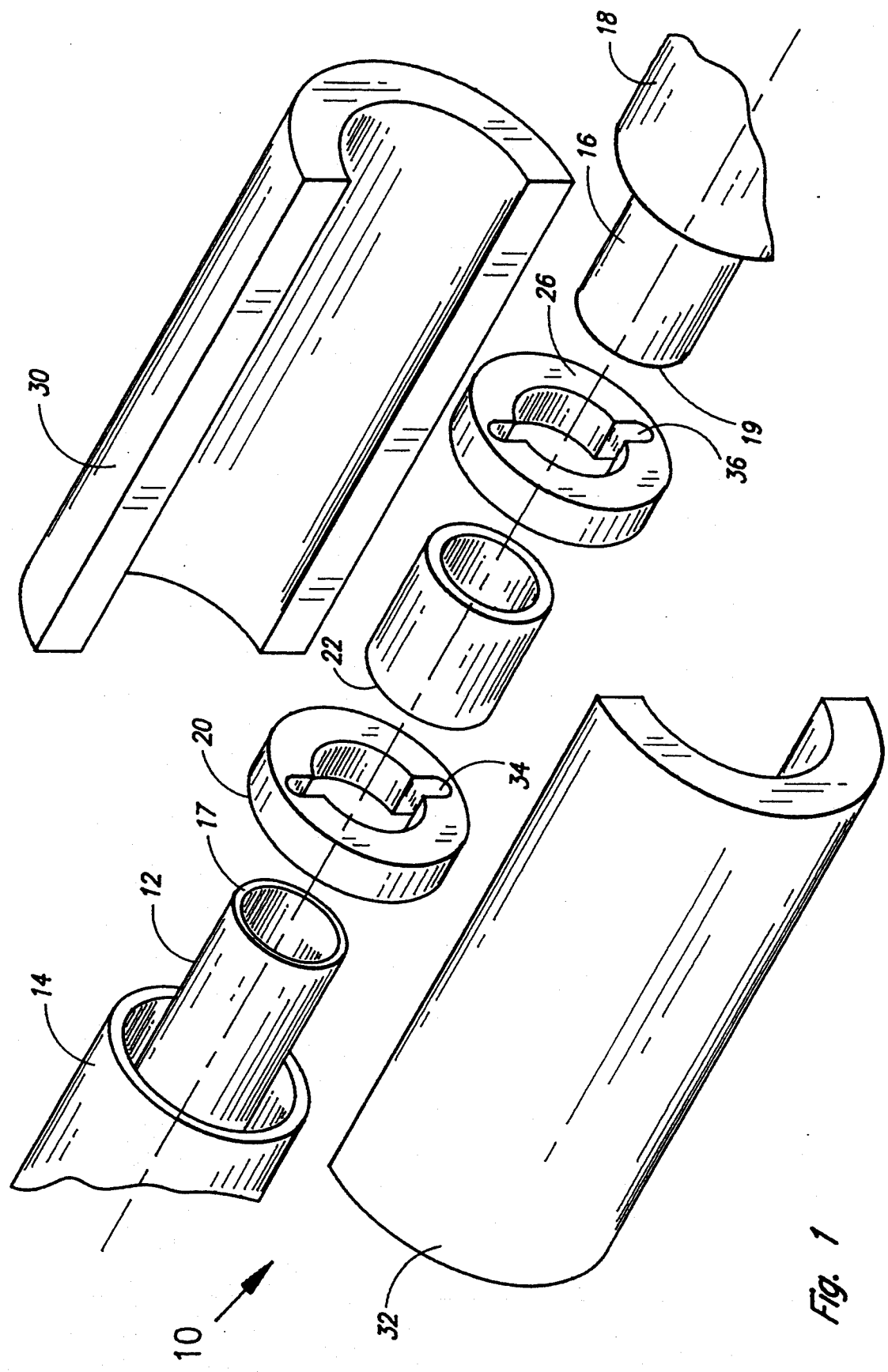

Referring to the drawings in detail, FIG. 1 illustrates an exploded view of an interlocking union apparatus 10 for a double containment pipe system. In a double containment pipe system, a series of double containment pipes are connected end to end for transportation of fluid.

A first double containment pipe includes a first tubular carrier pipe 12 located in-line concentrically within a first tubular containment pipe 14. The first double containment pipe will be stubbed out or installed so that the first carrier pipe 12 will extend axially beyond the end 17 of the first containment pipe 14.

Likewise, a second containment pipe 18 includes a second carrier pipe 16. The second carrier pipe 16 is stubbed out so that the second carrier pipe extends axially beyond the end 19 of the second containment pipe.

A first locking ring 20 is circular and has an inside diameter just slightly larger than the outside diameter of the first carrier pipe 12. The first locking ring 20 has an outside diameter greater than the inside diameter of the first containment pipe. The locking ring will thus, not be able to fit within the containment pipe.

In the embodiments shown, the outside diameter of the first locking ring 20 has an outside diameter equal to the outside diameter of the first containment pipe. The first locking ring 20 will be slipped over the end of the first carrier pipe and moved into position until it stops against the end of the first containment pipe 14.

A cylindrical carrier coupling 22 has a pair of opposed open ends. The carrier coupling 22 has an inside diameter just slightly larger than the outside diameter of the first carrier pipe 12 so that it can be placed over the end of the first carrier pipe and bonded thereto.

A second locking ring 26 is circular and similar to the first locking ring. The second locking ring 26 has an inside diameter slightly larger than the outside diameter of the second carrier pipe 16. The outside diameter of the second locking ring is greater than the inside diameter of the second containment pipe 18. Accordingly, the second locking ring will be slipped over and placed over the end of the second carrier pipe and moved into position until it abuts and stops against the second containment pipe 18. The second carrier pipe 16 is then inserted and bonded to the carrier coupling 22, after the second locking ring is placed into position. Accordingly, the carrier coupling is bonded to both the first carrier pipe and second carrier pipe.

A containment coupling may be designed in several configurations. In the embodiment shown in FIG. 1, the containment coupling is composed of two segments 30 and 32 which together form a cylindrical tube. The segments are divided longitudinally into two equal segments. The inside diameter of the containment coupling formed from the segments 30 and 32 is equal to the outside diameter of the first containment pipe 14 and the outside diameter of the second containment pipe 18. The containment coupling will be bonded to both the first containment pipe 14 and the second containment pipe 18.

It will also observed that both the first locking ring 20 and the second locking ring 26 each have optional channels 34 and 36 which serve as a passage for any fluid escaping from the carrier pipes as well as providing a channel for detection cable that may be placed therein.

FIGS. 2, 3, 4 and 5 show the sequential step by step process to install an interlocking union 10 of the present invention.

In the embodiment shown in FIGS. 2, 3, 4 and 5 an alternate containment coupling 38 is utilized. As an initial, additional step, the containment coupling 38 is slipped axially over one of the containment pipes 14 and slipped out of the way so as not to interfere with the installation process.

Figure 2:
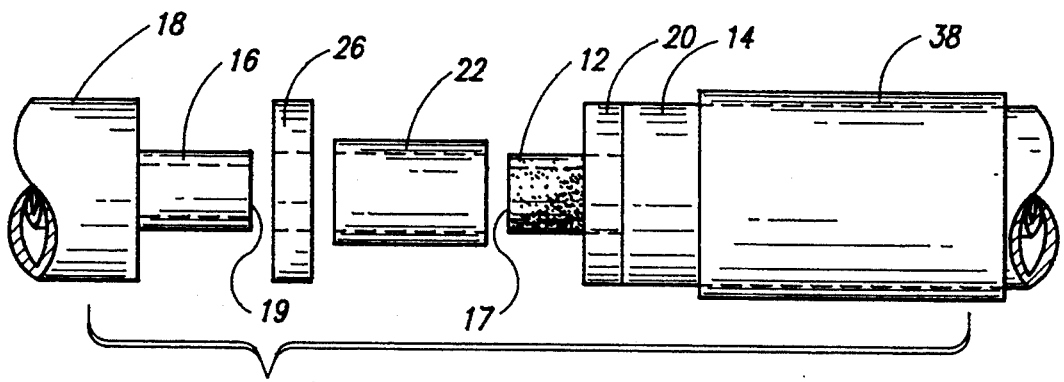

As seen in FIG. 2, the first locking ring has been slipped over the end 17 of the first carrier pipe 12. The first locking ring 20 is placed into position over the first carrier pipe and against the end of the first containment pipe 14. It will be observed that no adhesive or other fastener is used to hold the first locking ring.

Thereafter, as seen in FIG. 2, adhesive is placed over the end of the first carrier pipe 12 so that the carrier coupling 22 may be placed thereover and adhesively joined therewith.

Figure 3:
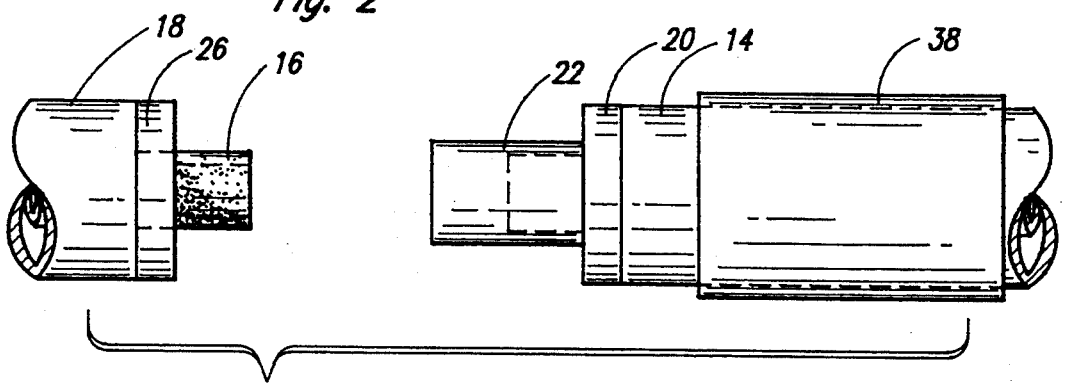

In FIG. 3, the carrier coupling 22 has been bonded to the first carrier pipe 12. Thereafter, the second locking ring 26 has been placed over the end of the second carrier pipe 16 and moved into position over the second carrier pipe 16 and against the end of the second containment pipe 18. Thereafter, adhesive will be placed over the end of the second carrier pipe in order to bond the second carrier pipe 16 to the carrier coupling 22.

Figure 4:
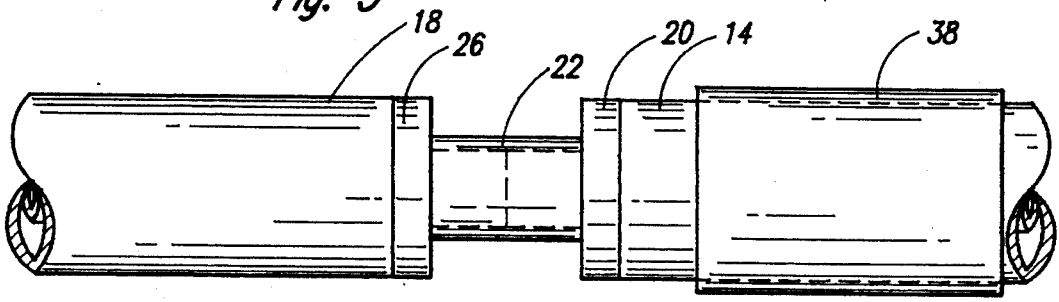

FIG. 4 shows the completion of the carrier coupling installation. Thereafter, the interlocking union may be tested with fluid through carrier pipes to assure that an adequate fluid-tight seal has been made. A full visual inspection may be made under operating conditions prior to completion of the installation.

Figure 5:
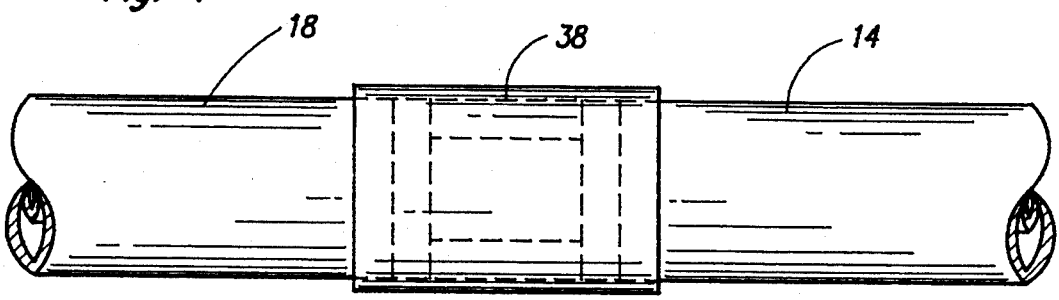

Finally, as seen in FIG. 5, the containment coupling 38 is moved axially and centered over the carrier coupling. The containment coupling 38 is adhesively bonded to the first containment pipe 14 and the second containment pipe 18.

Figure 6:
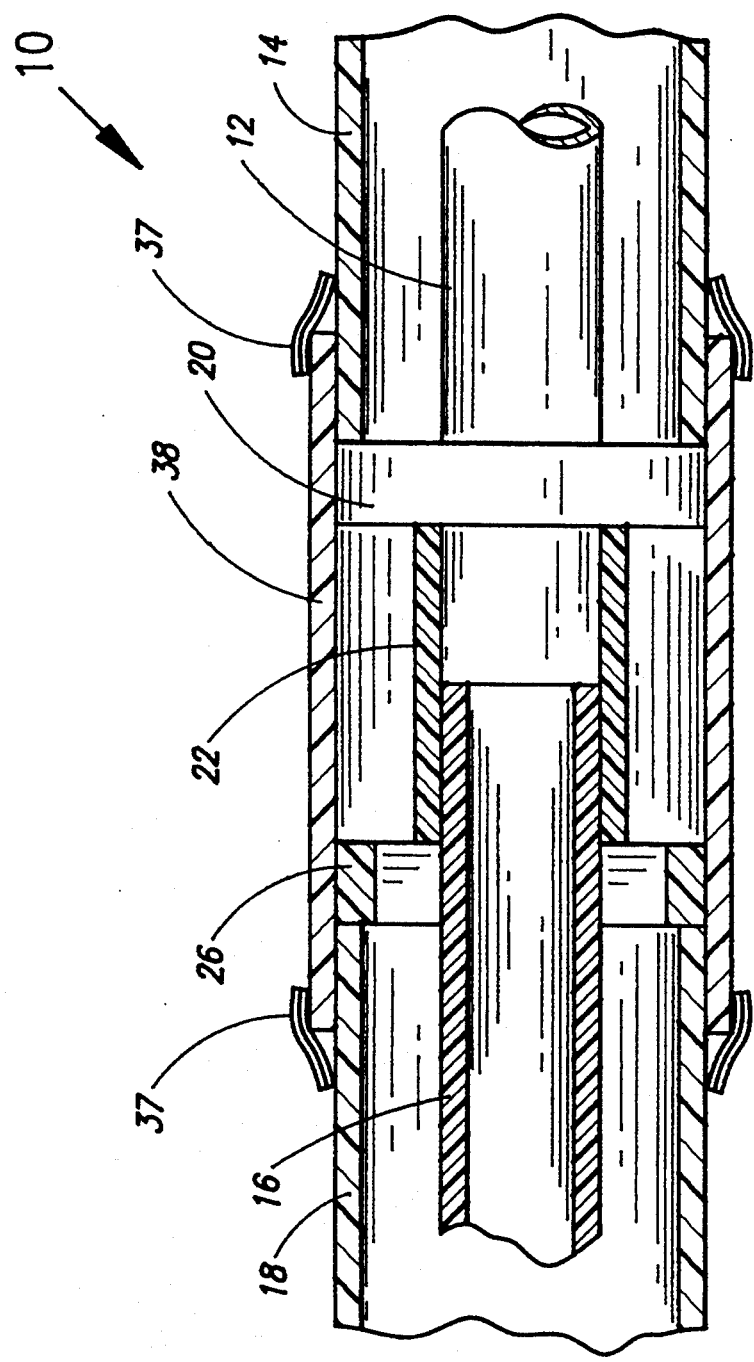

FIG. 6 shows a sectional view of the completed interlocking union after installation. An additional step of overwrapping the ends of the containment coupling 38 with saturated glass 37 is also illustrated to assure a fluid tight seal.

It will be observed that the first locking ring 20 is wedged between and held in place by both the first containment pipe 14 and the carrier coupling 22. Likewise, the second locking ring 26 is held in place and restrained from movement by the second containment pipe 18 and the carrier coupling 22. Since the carrier coupling 22 is bonded to both the carrier pipes, longitudinal movement between the carrier pipes and the containment pipes is prevented. Accordingly, the interlocking union provides a mechanism to prevent longitudinal movement between the carrier pipes and the containment pipes.

FIG. 7 shows a partial sectional view of the interlocking union 10 with an additional modification incorporated therein. The interlocking union 10 includes a port 40 within the containment coupling 39. The port 40 has internal threads in order to receive a plug 42 having external threads. In normal operating conditions, the plug 42 is within the opening 40. The plug 42 may be unthreaded and removed to drain off any fluid and also to act as an inspection point. The plug 42 may also be removed to act as a pull point to install detection cable therethrough.

Whereas, the present invention has been described in relation to the drawings attached hereto, it should be understood that other and further modifications, apart from those shown or suggested herein, may be made within the spirit and scope of this invention.

What is claimed is:

1. A process to install an interlocking union for joining a first double containment pipe having a first carrier pipe within a first containment pipe to a second double containment pipe having a second carrier pipe within a second containment pipe, which process comprises:
   slipping a first locking ring into position over the outside diameter of said first carrier pipe to stop against said first containment pipe;
   adhesively bonding a carrier coupling to said first carrier pipe stopping against said first locking ring;
   slipping a second locking ring into position over the outside diameter of said second carrier pipe stopping against said second containment pipe;
   adhesively bonding said carrier coupling to said second carrier pipe stopping against said second locking ring; and
   bonding a containment coupling to said first containment pipe and to said second containment pipe.

2. A process to install an interlocking union as set forth in claim 1 including the initial, additional step of sliding said containment coupling over said containment pipe.

3. A process to install an interlocking union as set forth in claim 1 including the additional step of providing said containment coupling in at least two segments split longitudinally.

4. A process to install an interlocking union as set forth in claim 1 including the additional step of overwrapping said containment coupling on said first and second containment pipes.

5. A process to install an interlocking union as set forth in claim 1 including the additional step of providing said first and said second locking rings with outside diameters equal to the outside diameter of said containment pipes.

6. A process to install and interlocking union as set forth in claim 1 including the additional step of providing a channel in said first locking ring and said second locking ring.

7. An interlocking union for joining a first double containment pipe having a first carrier pipe within a first containment pipe to a second double containment pipe having a second carrier pipe within a second containment pipe, which interlocking union comprises:
   a first locking ring around the outside diameter of said first carrier pipe to stop against said first containment pipe;
   a second locking ring around the outside diameter of said second carrier pipe to stop against said second containment pipe;
   means to lock said lock rings between said carrier coupling and said containment pipes;
   a carrier coupling bonded to said first carrier pipe and to said second carrier pipe, said carrier coupling stopping against said first locking ring and stopping against said second locking ring; and
   a containment coupling bonded to said first containment pipe and to said second containment pipe.

8. An interlocking union as set forth in claim 7 wherein said first and second locking rings have outside diameters equal to the outside diameter of said containment pipes.

* * * * *